(12) United States Patent
Yamaoka et al.

(10) Patent No.: US 8,083,989 B2
(45) Date of Patent: Dec. 27, 2011

(54) METHOD FOR PRODUCING THREE-DIMENSIONAL SHAPED ARTICLE

(75) Inventors: Tsuneji Yamaoka, Fukui (JP); Kouichi Amaya, Fukui (JP)

(73) Assignee: Matsuura Machinery Corporation, Fukui-shi, Fukui (JP)

( * ) Notice: Subject to any disclaimer, the term of this patent is extended or adjusted under 35 U.S.C. 154(b) by 222 days.

(21) Appl. No.: 12/624,115

(22) Filed: Nov. 23, 2009

(65) Prior Publication Data
US 2010/0202914 A1 Aug. 12, 2010

(30) Foreign Application Priority Data

Feb. 12, 2009 (JP) .................. 2009-030290

(51) Int. Cl.
*B22F 7/00* (2006.01)
*B29C 35/08* (2006.01)
(52) U.S. Cl. .......................... 419/28; 419/58
(58) Field of Classification Search .............. 419/26, 419/28, 58; 148/301
See application file for complete search history.

(56) References Cited

U.S. PATENT DOCUMENTS

| 6,682,688 B1 * | 1/2004 | Higashi et al. | 264/497 |
| 7,255,830 B2 * | 8/2007 | Abe et al. | 419/58 |
| 2006/0192322 A1 * | 8/2006 | Abe et al. | 264/497 |

FOREIGN PATENT DOCUMENTS
JP 10-24495 1/1998
* cited by examiner

*Primary Examiner* — Scott Kastler
(74) *Attorney, Agent, or Firm* — Richard M. Goldberg

(57) ABSTRACT

A method for producing a three-dimensional shaped article, including molding by irradiation of an optical beam to powder and by a rotating tool, providing a hollow part in a base pedestal supporting a shaped object, filling the hollow part with powder, forming a powder layer in the upper part of the hollow part and a surrounding region thereof, after a sintering region supporting the shaped object from the underside is formed in a region containing the powder layer, molding three or more supports of the base pedestal and two or more support frames connecting the shaped object, then the molded product and the base pedestal are then reversed in a vertical direction, thereby cutting and removing the sintering region, and molding the bottom part to achieve the object based on the fact that the supporting frames and the shaped object are cut and separated.

8 Claims, 5 Drawing Sheets

(a)

(b)

METHOD FOR PRODUCING THREE-DIMENSIONAL SHAPED ARTICLE

FIELD OF THE INVENTION

The present invention relates to a method for producing a three-dimensional shaped article, capable of molding a bottom part of the shaped article.

DESCRIPTION OF THE RELATED ART

In a method for producing a three-dimensional shaped article by sintering aggregated powder using an optical beam and moving a rotating tool, a region other than a bottom part of the three-dimensional shaped article is usually entirely molded based on the movement of the rotating tool. Since the bottom part is merely in contact with a base pedestal on which the shaped article is placed, it is a fact that the shape (the plane shape) of the bonded surface with the base pedestal and the bottom part is merely maintained and molding by the rotating tool is hardly performed.

In order to cope with such a situation, Patent Document 1 adopts the following processing steps. Both a shaped object (solid model part 7*a*) and a support (block part 7*b*) having a height larger than that of the shaped object and a support frame (connecting part 9) connecting the shaped object to the support are respectively molded on a base pedestal (table 5). The support and the support frame of the molded shaped object are then reversed in a vertical direction, thereby supporting the shaped object (solid model part 7*a*) via the support frame (connecting part 9) by an opposite end part to a part of the support (block part 7*b*) connected to the base pedestal (table 5). Then, a region portion (block part 7*b*) connecting the shaped object (solid model part 7*a*) to the base pedestal (table 5) is cut using the rotating tool. The shaped object (solid model part 7*a*) is further cut and separated from the support frame (connecting part 9). When the connecting region portion (block part 7*b*) is removed, the bottom part of the shaped object (solid model part 7*a*) can also be produced.

However, it is necessary to release the molded lower supporting part (block part 7*b*) and the support from the base pedestal (table 5) in order to cut the connected region portion (block part 7*b*) after the vertical direction is reversed as described above in the processing method. However, work for releasing the sintered shaped article without degradation and modification in dimensional shape accuracy from the base pedestal (table 5) is extremely difficult and complicated. When the shaped article is forcibly released, accidental breakage of the molded support has occurred.

Patent Document 1: Japanese Published Unexamined Patent Application No. 10-24495

DISCLOSURE OF THE INVENTION

Problems to be Solved by the Invention

It is an object of the present invention to provide a method for producing a three-dimensional shaped article, capable of easily removing the shaped article from a base pedestal and enabling the molding of a bottom part of the shaped article.

In order to solve the problems, the present invention has the following basic configuration:

(1) A method for producing a three-dimensional shaped object, comprising the steps of:

forming a sintering region by irradiating an optical beam to an aggregate of one of:

powder made of a metal and a material other than the metal capable of being sintered by irradiation of an optical beam; and molding along with cutting the sintering region while moving a rotating tool with respect to a surface of the sintering region, wherein, in order to form a hollow part below a region on which a bottom part of the shaped object is to be located in a base pedestal supporting the powder resulting in molding of the shaped object caused by the sintering and the cutting, a surrounding frame surrounding the hollow part is provided, and in a state where an upper end of the hollow part forms a hole surrounded by an upper end of the surrounding frame, the molding process of the bottom part is enabled by the following successive steps:

(a1) filling the hollow part with the powder;

(a2) forming a powder layer having a predetermined thickness on a region above the hole located at the upper end of the hollow part and a region above the surrounding frame located around the region;

(b) sintering one of:

the powder layer of the step (a) and a region not reaching the lowest end of the powder layer of the step (a)

and the powder with which the hollow part is filled, using the optical beam;

(c1) forming a sintering region by irradiating an optical beam to the powder aggregated on the sintering region obtained by the step (b);

(c2) molding the shaped object by cutting the sintering region while moving the rotating tool with respect to the surface of the sintering region;

(c3) molding at least three supports having a height at least equivalent to that of the shaped object, and at least two support frames having one end part supporting the shaped object and another end part connected to one of:

any region of the supports, the base pedestal and the powder layer sintered by the step (b), and a region thereover, by cutting the sintering region while moving the rotating tool with respect to the surface of the sintering region;

(d1) reversing molded products obtained by the step (c) and the base pedestal in a vertical direction;

(d2) removing the sintering region of the step (b) in a state where the base pedestal and the molded products of the step (c) are supported by top parts of the supports; and (d3) further performing a molding process of the bottom part of the shaped object; and (e) cutting and separating the shaped object from the support frames molded in the step (c).

BRIEF DESCRIPTION OF THE DRAWINGS

FIG. 2(*a*) shows a mesh-like configuration formed by parallel straight lines;

FIG. 2(*b*) shows a mesh-like configuration formed by crossing parallel straight lines with each other;

FIG. 3(*a*) shows a step (a) in which an inner region shown by a dotted part shows a region of a powder layer;

FIGS. 3(*b*)-(1) and (2) show a step (b);

FIGS. 3(*c*)-(1) and (2) show a step (c);

FIGS. 3(*d*)-(1) and (2) show a step (d);

FIGS. 3(e)-(1) and (2) show a step (e);

FIG. 5(a) shows a case where three supports are provided and all the other ends of support frames are connected to the supports so as to correspond to FIGS. 3(c)-(1) and 3(d)-(1); and FIG. 5(b) shows a case where four supports are provided and the other ends of support frames are connected to both a base pedestal and a sintered powder layer of the step (b) so as to correspond to FIGS. 3(c)-(2) and 3(d)-(2).

DESCRIPTION OF THE SYMBOLS

Figure 1:
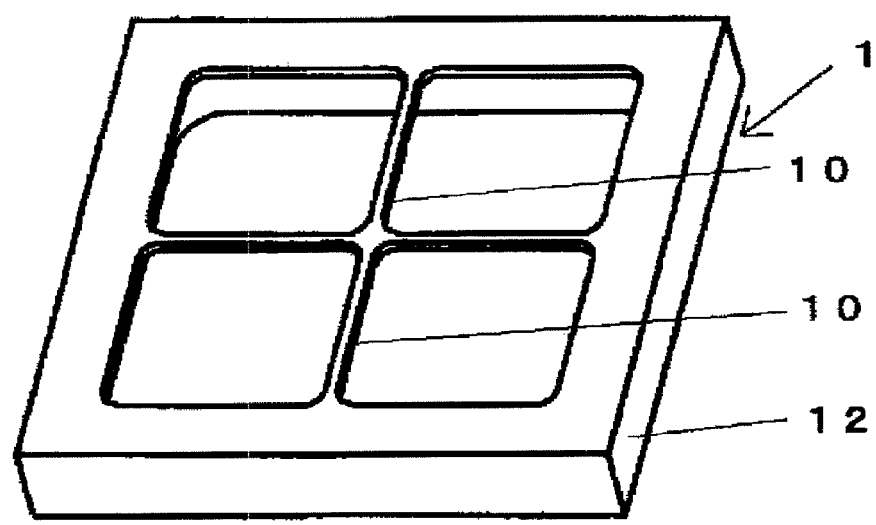
FIG. 1 is a diagrammatic sketch showing a configuration of Example 1.

1: base pedestal
2: sintering region
3: shaped object
4: support
5: support frame
6: rotating tool
7: irradiating part of optical beam
8: powder
10: bridging part
11: hollow part
12: surrounding frame

DESCRIPTION OF PREFERRED EMBODIMENTS

The steps of the basic configurations (a), (b), (c), (d) and (e) are shown in FIGS. 3(a), (b), (c) and (d). As shown in each of the drawings, the basic characteristics are the following. A sintering region 2 is formed by irradiating an optical beam to an aggregated powder 8. A hollow part 11 is formed below a region on which a bottom part of the shaped object 3 is to be located on a base pedestal 1. The shaped object 3 is formed along with and the sintering region 2 is cut while moving a rotating tool 6 with respect to the surface of the sintering region 2. A surrounding frame 12 is provided so as to surround the hollow part 11 from the outside, and the upper end of the hollow part 11 is in a state where a hole surrounded by the surrounding frame 12 is formed.

The area of the hollow part 11 can be selected to be larger than that of the region on which the bottom part of the shaped object 3 is to be located or smaller than that of the region.

As shown in FIG. 3(a), in the step (a), the hollow part 11 is filled with the powder 8, and a powder layer having a predetermined thickness is formed in a first region above the hole located at the upper end of the hollow part 11, and in a second region above the surrounding frame 12 and located around the first region. To form the powder layer in the surrounding region, as described later, requires sintering of the powder layer, and then the shaped object 3 is sintered and molded on the powder layer.

As shown in FIGS. 3(b)-(1) and (2), the powder layer (shown in FIG. 3(b)-(1)) or a region (shown in FIG. 3(b)-(2)) which does not reach the lowest end of the hollow part and which is formed of the powder layer of the step (a) and the powder layer with which the hollow is partially filled in the step (a), is sintered by irradiation of the optical beam at the step (b).

The sintering region 2 is set to a region which does not reach the lowest end of the powder layer and the powder 8 with which the hollow is filled, in order to prevent the adherence of an object located below the hollow by sintering, that is, to prevent the powder 8 sintering with an object or a device supporting the base pedestal 1.

In a case of an embodiment in which metal powder is selected as the powder 8, the thickness of the region of the powder 8 to be sintered can be set small. As shown in FIG. 3(b)-(1), a sintering state where the sintering region 2 is set to only the upper powder layer is obtained in the sintering of the step (b), and thereby the metal powder is suitably adopted.

However, where irradiation energy per unit area in the vertical direction component of the optical beam is set to a degree so that the thickness of the powder layer formed by the step (a) can be sintered in the irradiation of the step (b), and the horizontal scanning rate of the optical beam required for sintering strength required for supporting the weight of the shaped object 3 is set, the sintering region 2 can be made to coincide with the powder layer of the step (a). Furthermore, the required and suitable sintering strength can be realized without selecting metal powder.

In addition to the above-mentioned embodiment, a state where the sintering region 2 extends down but does not reach the lower end of the powder layer can be obtained by limiting the irradiation energy of the optical beam which can pass through the powder layer. However, generally, the larger the irradiation energy, the thicker the region to be sintered, and the sintering strength can be enhanced when the horizontal scanning rate of the optical beam is the same.

Therefore, as shown in FIG. 3(b)-(2), when the sintering region 2 reaches not only the region of the powder layer of the step (a) but also the region of the powder layer applied in the hollow, the irradiation energy of the optical beam is selected so that it does not reach the lower end of the powder layer, and the degree of the horizontal scan of the optical beam is set so that a sintered density capable of supporting the shaped object 3 can be realized.

FIG. 3(b)-(2) shows a case where the sintering region 2 reaches not only the powder layer of the step (a) but also the inner side region of the surrounding frame 12 located around the hollow and below the powder layer. The lower sintering region 2 may adhere to the inner side wall part of the surrounding frame 12 located around the hollow which constitutes the base pedestal 1.

A sintering region adhering to the wall part can be removed by the rotating tool 6 in the following step (d) when adhesion occurs. As a result, the complicated work for separating the sintered powder 8 from the base pedestal 1 as in the case of Patent Document 1 is not necessarily required.

However, since the wall part may be damaged in the removal, it is preferable to avoid this adhesion state.

FIGS. 3(a) and (b) show an embodiment in which the hollow part 11 is sequentially formed wider in a horizontal direction toward the lower side. In this embodiment, even when the sintering region 2 reaches the lower hollow part 11, because the optical beam is usually irradiated in a substantially vertical direction, the sintering region 2 is also formed in the substantially vertical direction. As a result, the adhesion of the sintered powder layer to the wall part of the base pedestal 1 can be prevented.

Figure 4:
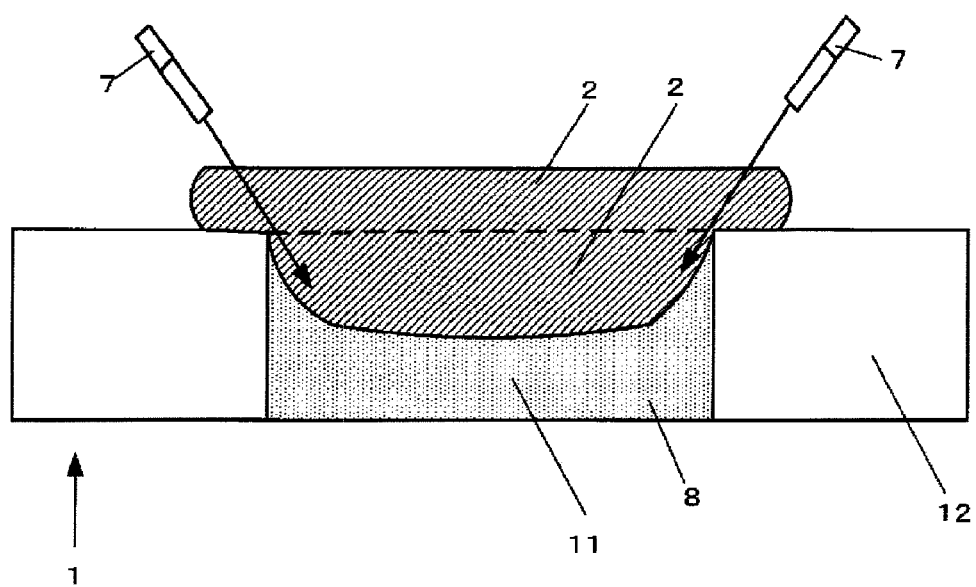
FIG. 4 is a side cross-sectional view illustrating an embodiment in which the radiation direction of an optical beam is set to a direction in which the optical beam is inclined so as to face the inner side of the hollow part, during sintering using the optical beam of the step (b)

As shown in FIG. 4, in another embodiment, the radiation direction of the optical beam is set to a direction in which the optical beam is inclined so as to face inwardly of the hollow part 11, that is, at an angle to the horizontal direction during sintering using the optical beam of the step (b). Even when the side wall of the hollow part 11 is molded in the vertical direction, the sintering region 2 is separated from the side wall toward the lower side of the hollow part 11 by the above-mentioned adjustment of the direction of an irradiating part 7 of the optical beam. As a result, adhesion of the sintered powder layer to the inner side wall of the surrounding frame 12 can be prevented.

Figure 3:
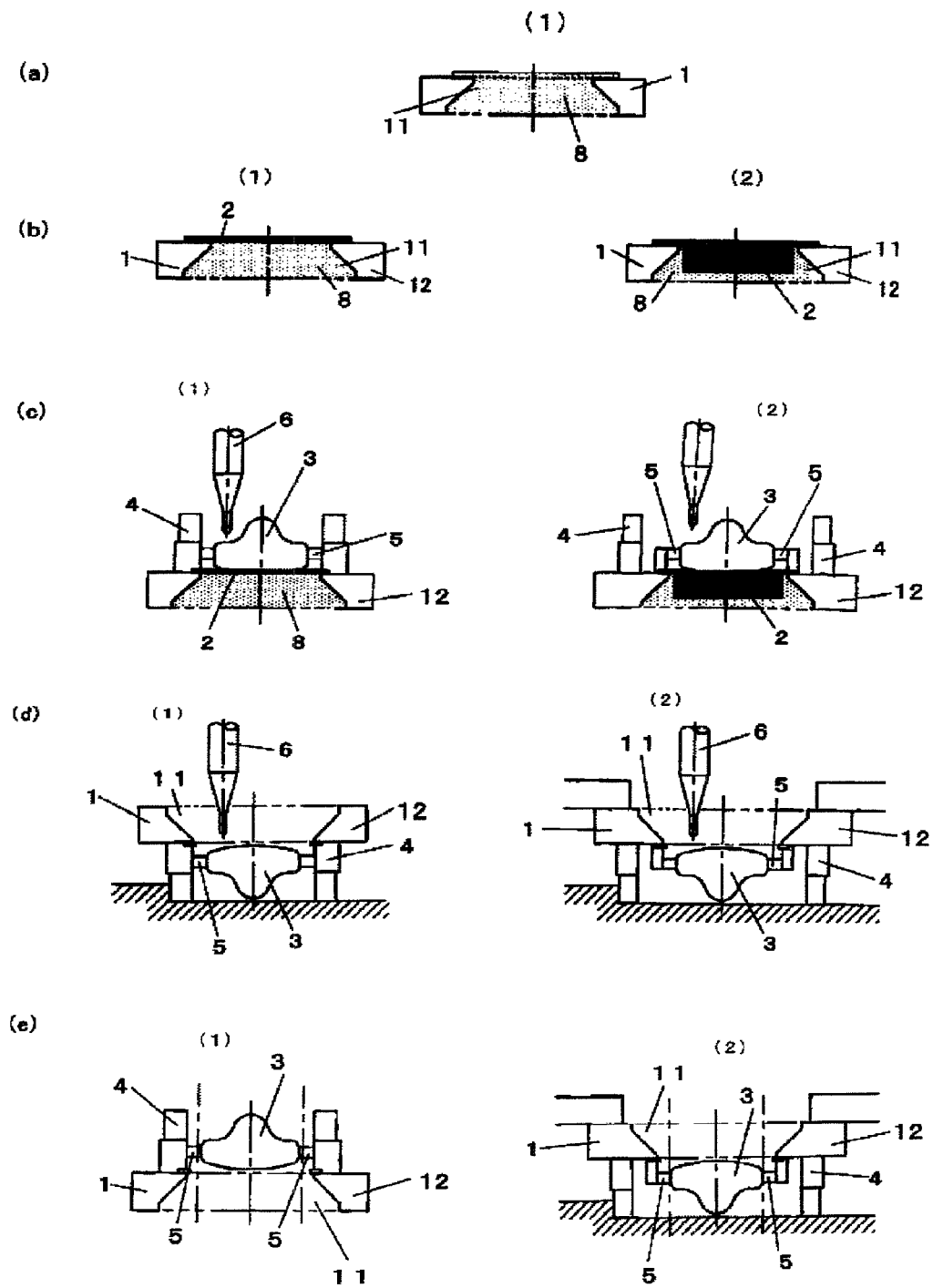
FIG. 3 illustrates a basic configuration of the present invention.

As shown in FIGS. 3(*c*)-(1) and (2), in the step (c), the sintering region 2 is formed by aggregating powder on the sintering region 2 by the irradiation of the optical beam. The shaped object 3 is molded along with cutting the sintering region 2 while moving the rotating tool 6 with respect to the surface of the sintering region 2. In addition, the sintering region 2 is formed by irradiating the optical beam to the aggregated powder 8 in the base pedestal 1 and/or the sintering region 2 obtained by the step (b). Three or more supports 4 having a height equivalent to, or larger than that of the shaped object 3 and two or more support frames 5 for the shaped object 3 are also molded along with cutting the sintering region 2 while moving the rotating tool 6 with respect to the surface of the sintering region 2.

The supports 4 can be molded on the base pedestal 1 and/or the sintering region 2 obtained by the step (b). FIG. 3(*c*)-(1) shows a case where the supports 4 are molded on the base pedestal 1 and the sintering region 2 is obtained by the step (b), and FIG. 3(*c*)-(2) shows a case where the supports 4 are molded on the base pedestal 1. In order to mold three or more supports 4 having a height equivalent to or larger than that of the shaped object 3, it is only necessary to secure a stable support state with respect to the shaped object 3 when the vertical direction is reversed in the following step (d).

Usually, the heights of the supports 4 are equally set in order to secure the stable support state when the vertical direction is reversed in the following step (d).

FIGS. 3(*c*)-(1) and (2) show a case where the heights of the supports 4 are larger than that of the shaped object 3. Even when the heights are equivalent, the shaped object 3 can also support itself under a stable condition.

The support frames 5 have one end connected to the shaped object 3. The other ends are indispensably connected to the supports 4, the base pedestal 1 or the sintering region 2 obtained by the step (b), or a region thereover, in order to provide a state where the shaped object 3 is integrated with the supports 4, the base pedestal 1 and the sintering region 2 obtained by the step (b) and reversed when the vertical direction is reversed in the following step (d).

FIG. 3(*c*)-(1) shows a case where all the support frames 5 are connected to the supports 4. FIG. 3(*c*)-(2) shows a case where all the support frames 5 are connected to both the base pedestal 1 and the sintering region 2 obtained by the step (b). An embodiment in which a part of the first ends of the support frames 5 are connected to the supports 4 and another part is connected to the base pedestal 1 and/or the sintering region 2 obtained by the step (b) can also be naturally adopted.

When at least two support frames 5 exist, the reversed state where the support frames 5 are integrated with the supports 4, the base pedestal 1 and the sintering region 2 obtained by the step (b) can be realized. When the vertical direction is reversed, three or more support frames 5 are preferable in order to secure the stable support state with respect to the shaped object 3.

Figure 5:
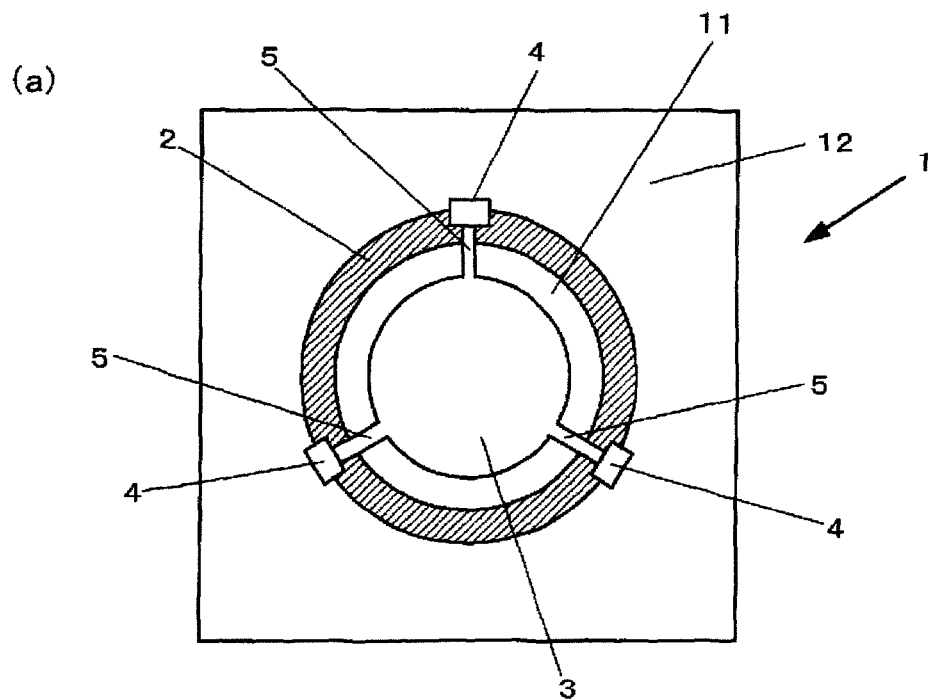
FIG. 5 is a plan view in a stage after the step (c)
Figure 5:
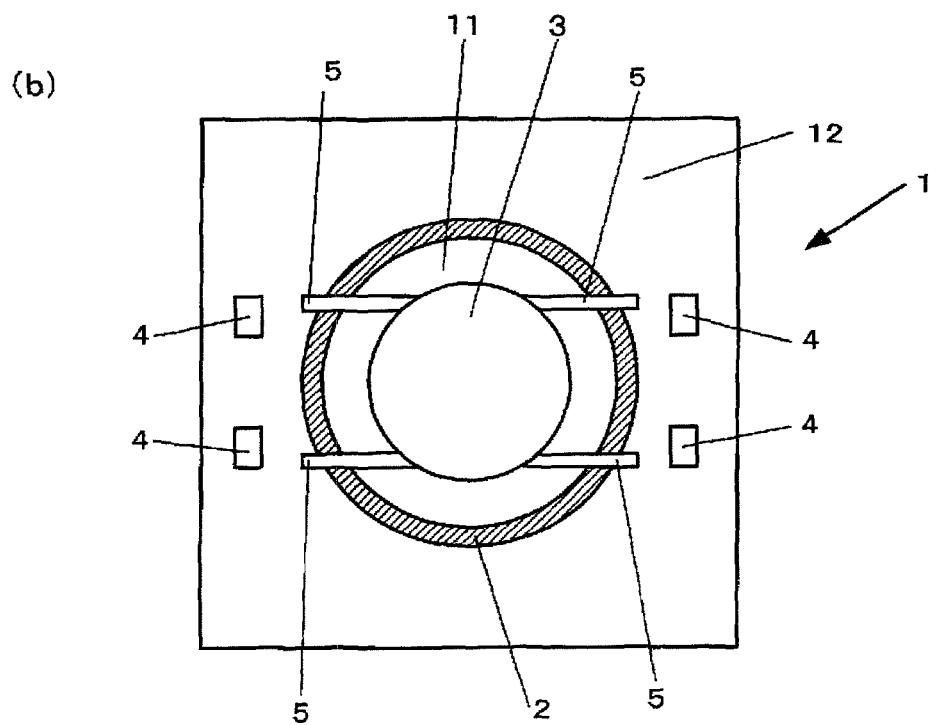

FIG. 3(*c*) and FIG. 3(*d*) are side views, and each shows two supports 4. However, in an actual situation, as shown in plan views of FIGS. 5(*a*) and (*b*), three supports 4 and four supports 4, respectively, can also be adopted. Of course, five or more supports 4 can also be adopted. However, four supports 4 are usually sufficient. It is not necessary to provide five or more supports 4 except in a case where the capacity or weight of the shaped object 3 is large and the stabilized support state cannot be obtained by four supports 4 when the vertical direction is reversed.

As shown in FIGS. 3(*d*)-(1) and (2), the vertical direction is reversed, and the sintering region 2 of the step (d) is removed. Furthermore, the predetermined molding of the bottom part is also realized. FIG. 3(*d*)-(1) shows a case where all the ends of the support frames 5 are connected to the supports 4 in the manner shown in FIG. 3(*c*)-(1), and FIG. 3(*d*)-(2) shows a case where the ends of the support frames 5 are connected to both the base pedestal 1 and the sintering region 2 obtained by the step (b) in the manner shown in FIG. 3(*c*)-(2).

As shown in FIG. 3(*d*)-(2), when the area of the hollow part 11 is larger than that of the bottom part of the shaped object 3, the whole region of the bottom part can be molded.

On the other hand, when the area of the hollow part 11 is smaller than that of the bottom part of the shaped object 3, the whole region of the bottom part cannot be molded, and a range which can be molded will be limited.

Therefore, a range in which the hollow part 11 is provided will be selected by whether a molding process is to performed at any position of the bottom part.

The shaped object 3 supported and molded in FIGS. 3(*e*)-(1) and (2) (the step e). It is then cut and separated from the support frames 5, and the shaped object 3 in an independent state can be obtained. FIG. 3(*e*)-(1) shows a case where the vertical direction is reversed back again to its original orientation from the reversed state of the step (d), and the shaped object 3 is cut and separated from the support frames 5 in the original design state. FIG. 3(*e*)-(2) shows a state where the shaped object 3 is cut and separated from the support frames 5 in the reversed state.

As shown in FIG. 3(*e*)-(1), when the shaped object 3 is cut and separated from the support frames 5 in the original molding state, the second reversing step to the basic configuration (2) is required. However, when the shaped object 3 is cut and separated from the support frames 5 in the reversed state in FIG. 3(*e*)-(2), the second reversing step to the basic configuration (2) is unnecessary.

When the shaped object 3 exists in a region larger than the hollow part 11 in the horizontal direction, it is difficult to cut and separate the shaped object 3 from the hollow part 11 side while maintaining the reversed state. Thereby, the separation step (e) is performed after re-reversing as in the basic configuration (2).

As is apparent from the above-mentioned description of the embodiment, the hollow part 11 is provided in the step (a), and the shaped object 3, the supports 4 and the support frames 5 are then molded in the step (c) on the upper side of the sintering region 2 obtained by the step (b). The vertical direction is reversed as in the step (d), thereby removing the sintering region 2 of the step (b) and molding the bottom part. In the case of the shaped object 3 obtained as a result of cutting and separating the shaped object 3 as in the step (e), the molding process of the bottom part can be smoothly realized. The effect of this operation is extremely useful for a work where it is complicated for separation of the shaped object 3 from the base pedestal 1, and the operation of Patent Document 1 is completely unnecessary.

EXAMPLES

Hereinafter, Examples will be described.

Example 1

As shown in FIG. 1, Example 1 is characterized in that bridging over parts 10 which bridge a hollow part 11 are provided in a base pedestal 1, and powder 8 in the step (a) is also formed on the bridging parts 10.

Since a sintered powder layer can be supported from the underside by the bridging parts 10, a shaped object 3 formed on the powder layer via the bridging parts 10 can be supported under a stable condition even when the horizontal area of the hollow part 11 is large.

Example 2

Figure 2:
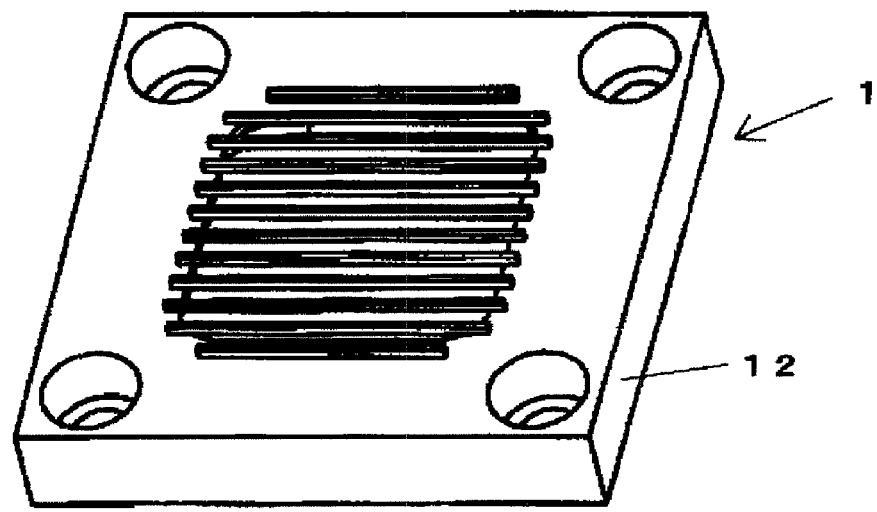
FIG. 2 is a diagrammatic sketch showing a configuration of Example 2.
Figure 2:
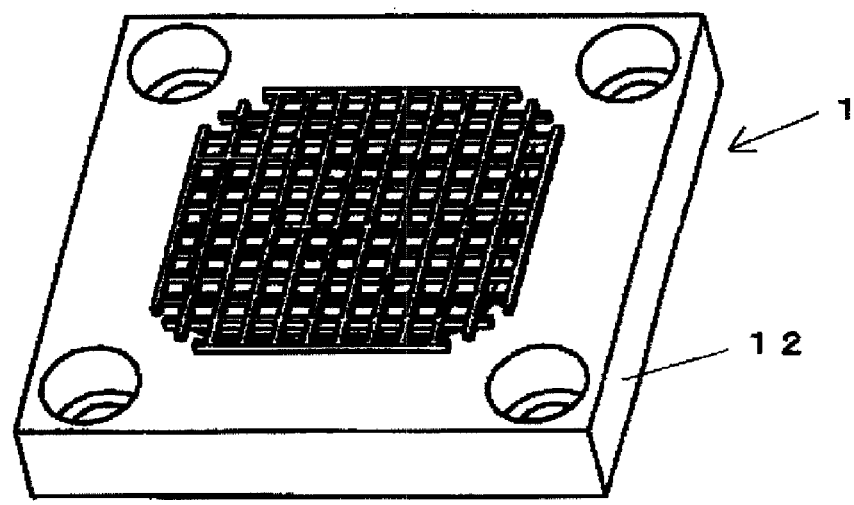

As shown in FIGS. 2(a) and (b), Example 2 is characterized in that a powder layer in the step (b), or a powder 8 with which the powder layer and a hollow are filled is sintered by using a mesh-like configuration formed by parallel straight lines or a mesh-like configuration formed by crossing the parallel straight lines with each other in place of sintering the whole surface of the powder layer.

The powder layer, or a sintering region 2 of the powder layer and the hollow part 11 below the powder layer aims at supporting the shaped object 3 from the underside. However, to achieve this, the whole sintering region 2 must not be necessarily sintered.

That is, if sintering strength required for supporting the shaped object 3 from the underside is realized, the sintering region 2 can be sufficiently formed by sintering using the mesh-like configuration formed by the parallel straight lines as shown in FIG. 2(a) or the mesh-like configuration formed by crossing the parallel straight lines with each other as shown in FIG. 2(b).

As shown in FIG. 3(b)-(2), even when both the powder layer above the hole and the powder 8 with which the hollow is filled, are sintered in the step (b), the lower side powder 8 of the powder layer is also subjected to the same sintering for forming mesh-like lines using the mesh-like configuration shown in FIGS. 2(a) and (b).

In Example 2, working efficiency required for sintering can be enhanced.

EFFECTS OF THE INVENTION

The present invention can remove the sintering region of the step (b) from the upper side of the hollow part and mold the bottom part of the shaped object molded by the step (c) after the vertical direction is reversed as in the step (d), based on the basic configuration, without the separation step from the base pedestal. In addition, the present invention can cut and remove the shaped object having the molded bottom part in the step (e) to easily bring the shaped object into an independent state.

The present invention can be applied to all the methods for producing the three-dimensional shaped article having the bottom part to be molded.

What is claimed is:

1. A method for producing a three-dimensional shaped object, comprising the steps of:
   forming a sintering region by irradiating an optical beam to an aggregate of one of:
      powder made of a metal and
      a material other than the metal capable of being sintered by irradiation of an optical beam; and
   molding along with cutting the sintering region while moving a rotating tool with respect to a surface of the sintering region,
   wherein, in order to form a hollow part below a region on which a bottom part of the shaped object is to be located in a base pedestal supporting the powder resulting in molding of the shaped object caused by the sintering and the cutting, a surrounding frame surrounding the hollow part is provided, and in a state where an upper end of the hollow part forms a hole surrounded by an upper end of the surrounding frame, the molding process of the bottom part is enabled by the following successive steps:
   (a1) filling the hollow part with the powder;
   (a2) forming a powder layer having a predetermined thickness on a region above the hole located at the upper end of the hollow part and a region above the surrounding frame located around the region;
   (b) sintering one of:
      the powder layer of the step (a) and
      a region not reaching the lowest end of the powder layer of the step (a)
   and the powder with which the hollow part is filled, using the optical beam;
   (c1) forming a sintering region by irradiating an optical beam to the powder aggregated on the sintering region obtained by the step (b);
   (c2) molding the shaped object by cutting the sintering region while moving the rotating tool with respect to the surface of the sintering region;
   (c3) molding at least three supports having a height at least equivalent to that of the shaped object, and at least two support frames having one end part supporting the shaped object and another end part connected to one of:
      any region of the supports, the base pedestal and the powder layer sintered by the step (b), and
      a region thereover,
   by cutting the sintering region while moving the rotating tool with respect to the surface of the sintering region;
   (d1) reversing molded products obtained by the step (c) and the base pedestal in a vertical direction;
   (d2) removing the sintering region of the step (b) in a state where the base pedestal and the molded products of the step (c) are supported by top parts of the supports; and
   (d3) further performing a molding process of the bottom part of the shaped object; and
   (e) cutting and separating the shaped object from the support frames molded in the step (c).

2. The method for producing the three-dimensional shaped article according to claim 1, further comprising the steps of:
   re-reversing the shaped object and the base pedestal in the vertical direction after the molding of the step (d) to locate the molded product on an upper side of the base pedestal, and
   then performing the cutting/separating step (e).

3. The method for producing the three-dimensional shaped article according to claim 1, wherein metal powder is selected.

4. The method for producing the three-dimensional shaped article according to claim 1, comprising the steps of:
   setting irradiation energy per unit area in a vertical direction component of the optical beam to a degree so that a thickness of the powder layer formed by the step (a) can be sintered in the irradiation of the step (b), and
   setting a horizontal scanning rate of the optical beam required for sintering strength required for supporting a weight of the shaped object.

5. The method for producing the three-dimensional shaped article according to claim 1, comprising the step of sequentially forming the hollow part wider in a horizontal direction toward a lower side of the hollow part.

6. The method for producing the three-dimensional shaped article according to claim 1, comprising the step of setting a radiation direction of the optical beam to a direction in which the optical beam is inclined so as to face an inner side of the hollow part on the basis of the horizontal direction around the hollow part in sintering by the optical beam of the step (b).

7. The method for producing the three-dimensional shaped article according to claim 1, comprising the steps of:
   providing a bridging part which bridges over the hollow part on the base pedestal, and
   forming the powder layer of the step (a) on the bridging part.

8. The method for producing the three-dimensional shaped article according to claim 1, comprising the step of performing the sintering using a mesh-like configuration formed by one of:
   parallel straight lines and
   a mesh-like configuration formed by crossing the parallel straight lines with each other
in place of sintering an entire surface of the powder layer in sintering one of:
   the powder layer of the step (b) and the powder with which the powder layer of the step (b) and the hollow are filled.

* * * * *